(12) United States Patent
Cicchini

(10) Patent No.: US 11,261,785 B2
(45) Date of Patent: Mar. 1, 2022

(54) FLIGHT VEHICLE AIR BREATHING ENGINE WITH ISOLATOR HAVING BULGED SECTION

(71) Applicant: Raytheon Company, Waltham, MA (US)

(72) Inventor: Nicholas P. Cicchini, Vail, AZ (US)

(73) Assignee: Raytheon Company, Waltham, MA (US)

( * ) Notice: Subject to any disclaimer, the term of this patent is extended or adjusted under 35 U.S.C. 154(b) by 627 days.

(21) Appl. No.: 15/615,146

(22) Filed: Jun. 6, 2017

(65) Prior Publication Data

US 2018/0347461 A1 Dec. 6, 2018

(51) Int. Cl.
*F02C 7/00* (2006.01)
*F02C 7/04* (2006.01)
(Continued)

(52) U.S. Cl.
CPC ............... *F02C 7/04* (2013.01); *B64D 27/16* (2013.01); *F02C 3/04* (2013.01); *F02K 7/10* (2013.01);
(Continued)

(58) Field of Classification Search
CPC ..... F02K 7/10; F02K 7/14; F02K 9/78; F02C 7/04; F05D 2220/10; F05D 2220/32;
(Continued)

(56) References Cited

U.S. PATENT DOCUMENTS

| 2,989,846 A | 6/1961 | Hausammann |
| 3,777,488 A | 12/1973 | Gross et al. |

(Continued)

FOREIGN PATENT DOCUMENTS

| EP | 1 445 465 A1 | 8/2004 |
| EP | 1 898 080 A2 | 3/2008 |

(Continued)

OTHER PUBLICATIONS

International Search Report and Written Opinion for corresponding International Application No. PCT/US2018/018728 dated May 4, 2018.

(Continued)

*Primary Examiner* — Edwin Kang
(74) *Attorney, Agent, or Firm* — Renner, Otto, Boisselle & Sklar, LLP

(57) ABSTRACT

A flight vehicle has an engine that includes air inlet, an isolator (or diffuser) downstream of the air inlet, and a combustor downstream of the isolator. The isolator includes a bulged region that has at least one dimension, perpendicular to the direction of the air flow from the inlet to the combustor, that is at a local maximum, larger than comparable isolator dimensions both upstream and downstream of the bulged region. The bulged region stabilizes shocks within the isolator, and facilitates flow mixing. The flow diversion of high energy flow around the outermost walls of the bulged section into the center of the flow at the aft end of the isolator, increases mixing of the flow, and results in a more consistent flow profile entering the combustor over a wide range of flight conditions (Mach, altitude, angle-of-attack, yaw) and throttle settings.

16 Claims, 3 Drawing Sheets

(51) Int. Cl.
  *B64D 27/16* (2006.01)
  *F02C 3/04* (2006.01)
  *F02K 7/10* (2006.01)
  *F23R 3/20* (2006.01)
  *B64D 33/02* (2006.01)

(52) U.S. Cl.
  CPC .......... *F23R 3/20* (2013.01); *B64D 2033/026* (2013.01); *B64D 2033/0273* (2013.01); *F05D 2220/10* (2013.01); *F05D 2220/80* (2013.01); *F05D 2240/35* (2013.01)

(58) Field of Classification Search
  CPC .......... F05D 2220/80; F23R 3/04; F23R 3/20; B64D 27/16; B64D 27/20; B64D 33/20
  See application file for complete search history.

(56) References Cited

U.S. PATENT DOCUMENTS

| | | | |
|---|---|---|---|
| 3,792,584 A * | 2/1974 | Klees | F02K 3/025 60/204 |
| 3,879,941 A * | 4/1975 | Sargisson | F02K 3/06 60/226.3 |
| 4,726,279 A | 2/1988 | Kepler et al. | |
| 4,930,309 A * | 6/1990 | Hartman | F02K 7/12 417/173 |
| 5,058,837 A | 10/1991 | Wheeler | |
| 5,082,206 A | 1/1992 | Kutschenreuter, Jr. et al. | |
| 5,114,099 A | 5/1992 | Gao | |
| 5,116,251 A * | 5/1992 | Bichler | B64D 33/02 137/15.1 |
| 5,337,975 A * | 8/1994 | Peinemann | B64D 33/02 244/53 B |
| 5,586,735 A * | 12/1996 | Falempin | B64D 33/02 137/15.1 |
| 5,881,758 A * | 3/1999 | Koncsek | F02C 7/042 137/15.2 |
| 6,793,175 B1 | 9/2004 | Sanders et al. | |
| 7,048,229 B2 | 5/2006 | Sanders et al. | |
| 8,434,723 B2 | 5/2013 | Simpson et al. | |
| 8,484,980 B1 | 7/2013 | Trefny et al. | |
| 8,656,957 B2 | 2/2014 | Babinsky et al. | |
| 9,447,731 B1 | 9/2016 | Adamson et al. | |
| 2006/0107648 A1 | 5/2006 | Bulman et al. | |
| 2007/0235590 A1 | 10/2007 | Kokoshkin et al. | |
| 2008/0060361 A1 | 3/2008 | Morrison et al. | |
| 2008/0092519 A1 | 4/2008 | Bulman | |
| 2008/0128547 A1 | 6/2008 | Pederson et al. | |
| 2008/0283677 A1 | 11/2008 | Pederson et al. | |
| 2010/0288379 A1 | 11/2010 | Dahm | |
| 2012/0018021 A1 | 1/2012 | Babinsky | |
| 2012/0049008 A1 | 3/2012 | Domel et al. | |
| 2014/0182697 A1 | 7/2014 | Davidenko et al. | |
| 2014/0224949 A1 | 8/2014 | Rybalko et al. | |
| 2016/0290143 A1 * | 10/2016 | Da Costa Vinha | F02K 7/10 |
| 2018/0274486 A1 * | 9/2018 | O'Brien | B64D 33/02 |

FOREIGN PATENT DOCUMENTS

| | | |
|---|---|---|
| EP | 3075663 | 1/2016 |
| GB | 911 074 | 11/1962 |
| JP | 2004270691 | 9/2004 |
| RU | 2 343 297 | 10/2009 |
| WO | 2017/158857 A1 | 9/2017 |

OTHER PUBLICATIONS

Guonko et al., "Numerical investigation of flow over two sweepback wedges at M=4 and 6", Thermophysics and Aeromechanics, vol. 20, No. 2, 2013, pp. 179-193.
Settles et al., "Investigation of Three-Dimensional Shock/Boundary-Layer Interactions at Swept Compression Corners", AIAA Journal, vol. 18, No. 7, Jul. 1980, pp. 779-785.
Settles et al., "Cylindrical and Conical Flow Regimes of Three-Dimensional Shock/Boundary-Layer Interactions", AIAA Journal, vol. 22, Feb. 1984, pp. 194-200.
Inger, "Supersonic Viscous-Inviscid Interaction of a Swept Ramp with a Turbulent Boundary Layer", AIAA-85-1669, Jul. 1985, 60 pages.
Stalker, "Spanwise Propagation of Disturbances in Swept Shock Wave-Boundary Layer Interactions", AIAA-82-0988, Jun. 1982, 9 pages.
Zheltovodov et al., "Shock Wave-Boundary-Layer Interactions," Chapter 5.3.4 "Swept Compression Ramp; Interaction and Its Modeling", 2011, pp. 230-237.
Maheswaran et al., "Computational Analysis The Effect of Micro Vortex Generator in E2R Scramjet Engine", May 2013, International Journal of Engineering Research & Technology.
Sabean et al., "Computational Optimization of a Hypersonic Rectangular-to-Circular Inlet", Journal of Propulsion and Power, vol. 17, No. 3, May-Jun. 2001, pp. 571-578.
Sabean et al., "Optimization of a Hypersonic Inlet with a Rectangular to Circular Transition", American Institute of Aeronautics & Astronautics, AIAA-99-0612, 1999, pp. 1-9.
Pending claims of co-pending U.S. Appl. No. 15/468,441, filed Mar. 24, 2017.
Pending claims of co-pending U.S. Appl. No. 15/615,152, filed Jun. 6, 2017.
Office Action issued in corresponding European Application No. 18708538.6 dated Feb. 10, 2021.
Office Action issued in corresponding Japanese Application No. 2019-567308 dated Apr. 6, 2021.

* cited by examiner

FLIGHT VEHICLE AIR BREATHING ENGINE WITH ISOLATOR HAVING BULGED SECTION

FIELD OF THE INVENTION

The invention is in the field of engines for flight vehicles such as airplanes, missiles, pulse detonation engines, projectiles or access-to-space systems.

DESCRIPTION OF THE RELATED ART

Supersonic and hypersonic airb reathing engines, such as dual-mode ramjets/scramjets, include isolators. The isolator is typically a constant-area or slightly-monotonically-increasing area section located downstream of an air inlet throat, between the inlet and an engine/combustor. The purposes for the isolator may be to separate fluctuations between conditions in the inlet and the combustor, to provide a desired flow profile to the combustor, to reduce problems with inlet unstart and/or combustion stability. The isolator may also provide additional pressure rise upstream of the combustor when the combustor demands it.

Isolators can have shock systems setup along their lengths. The resulting shock train can create pressure rises that match those demanded by the combustor. This pressure rise must not allow pressure communications to travel through the isolator boundary layer and upstream past the inlet throat or allow the shock train to extend upstream of the inlet throat, both potentially resulting in unstart of the inlet. The isolator removes dynamic cross-talk between fluctuations in the inlet or combustor that can result in inlet unstart or engine flame-out/stall. Strong shock-boundary layer interactions can occur within the isolator, especially on the body-side of a vehicle where the boundary layer is thickest and has a more depleted energy profile. These strong shock interactions with weak boundary layers can result in high distortion of the flow profile (mass flux, Mach Number, total pressure, etc.) at the isolator exit, which will be ingested by the engine and may reduce combustion efficiency or cause engine stall/flame-out.

SUMMARY OF THE INVENTION

A flight vehicle engine isolator includes a bulged region that has at least one dimension, perpendicular to the direction of the air flow from an inlet of the engine (upstream of the isolator) to a combustor of the engine (downstream of the isolator), that is at a local maximum, larger than comparable isolator dimensions both upstream and downstream of the bulged region.

According to an aspect of the invention, a flight vehicle includes: a fuselage; and an engine mechanically coupled to the fuselage. The engine includes: an air inlet; an isolator downstream of the air inlet; and a combustor downstream of the isolator. Air passing through the air inlet and the isolator to the combustor passes through a minimum cross-sectional area at a throat that is at the boundary between the air inlet and the isolator. The isolator has a bulged region, where at least one dimension of the isolator, in a direction perpendicular to airflow through the isolator, has a local dimension maximum that is greater than both upstream (to the throat) and downstream (to the isolator exit/engine face start) of the bulged region.

According to an embodiment of any paragraph(s) of this summary, the bulged region has a cross-sectional area, perpendicular to the airflow through the isolator, than has a local area maximum that is greater than both the upstream and downstream areas of the bulged region.

According to an embodiment of any paragraph(s) of this summary, a shape of the cross-sectional area is the same as cross-sectional shapes, perpendicular to the airflow through the isolator, both upstream and downstream of the bulged region.

According to an embodiment of any paragraph(s) of this summary, a shape of the cross-sectional area is different from at least one of cross-sectional shapes, perpendicular to the airflow through the isolator, both upstream and downstream of the bulged region.

According to an embodiment of any paragraph(s) of this summary, the bulged region has at least one additional dimension that the does not have a local maximum in the direction perpendicular to airflow through the isolator, the at least one additional dimension being less than at least one of an upstream value and a downstream value.

According to an embodiment of any paragraph(s) of this summary, at least one additional dimension in the direction perpendicular to airflow through the isolator is less than both the upstream value and the downstream value.

According to an embodiment of any paragraph(s) of this summary, the combustor is a ramjet.

According to an embodiment of any paragraph(s) of this summary, the combustor is a scramjet.

According to an embodiment of any paragraph(s) of this summary, the combustor includes a turbine.

According to an embodiment of any paragraph(s) of this summary, the engine is a supersonic engine.

According to an embodiment of any paragraph(s) of this summary, the engine is a hypersonic engine.

According to an embodiment of any paragraph(s) of this summary, the engine is a subsonic engine.

According to an embodiment of any paragraph(s) of this summary, the engine and/or its components, such as its inlet, can be any combination of geometries, for example being axisymmetric, having a two-dimension configuration (same cross sectional shape at different longitudinal locations), and/or having a complex three-dimensional shape (different cross sectional shape at different longitudinal locations).

According to an embodiment of any paragraph(s) of this summary, the bulged region has a circular cross-section in the direction perpendicular to airflow through the isolator.

According to an embodiment of any paragraph(s) of this summary, the bulged region has an elliptical cross-section in the direction perpendicular to airflow through the isolator.

According to an embodiment of any paragraph(s) of this summary, the bulged region has a rectangular cross-section in the direction perpendicular to airflow through the isolator.

According to an embodiment of any paragraph(s) of this summary, the bulged region has a square cross-section in the direction perpendicular to airflow through the isolator.

According to an embodiment of any paragraph(s) of this summary, the bulged region has a quadrangular cross-section in the direction perpendicular to airflow through the isolator.

According to an embodiment of any paragraph(s) of this summary, the bulged region has a trapezoidal cross-section in the direction perpendicular to airflow through the isolator.

According to an embodiment of any paragraph(s) of this summary, a maximum cross-sectional area of the bulged region, perpendicular to the airflow through the isolator, is at least 110% of either a minimum cross-sectional area of the isolator or relative to the area at the aft end of the isolator, perpendicular to the airflow through the isolator.

According to an embodiment of any paragraph(s) of this summary, the bulged region functions as a shock trap that limits movement of shocks within the isolator.

According to an embodiment of any paragraph(s) of this summary, the isolator includes a mixout region in the aft portion of the bulged region, in which flow distortion due to the aft bulged region is reduced.

According to another aspect of the invention, a method of operating a flight vehicle engine, the method including the steps of: compressing air coming into the engine, in an air intake of the engine; passing the air from the air intake through an isolator of the engine, to a combustor of the engine; and using the air from the isolator for combustion of fuel in the combustor. The passing the air through the isolator includes passing the air through a bulged region of the isolator, with the bulged region having a local maximum in cross-sectional area perpendicular to a direction of air flow through the isolator, with the cross-sectional area greater in the bulged region than both upstream of the bulged region (e.g, to the inlet throat) and downstream of the bulged region (e.g., to the isolator exit).

According to an embodiment of any paragraph(s) of this summary, passing air through the isolator includes causing shocks in the air flow in the bulged region, or elsewhere in the isolator.

According to an embodiment of any paragraph(s) of this summary, causing shocks includes causing oblique shocks that are not perpendicular to the direction of the air flow through the isolator.

According to an embodiment of any paragraph(s) of this summary, causing shocks includes causing normal shocks that are perpendicular to the direction of the air flow through the isolator.

According to yet another aspect of the invention, a flight vehicle engine includes: an air inlet; an isolator downstream of the air inlet; and a combustor downstream of the isolator. Air passing through the air inlet and the isolator to the combustor passes through a minimum cross-sectional area at a throat that is at the boundary between the air inlet and the isolator. The isolator has a bulged region, where at least one dimension of the isolator, in a direction perpendicular to airflow through the isolator, has a local dimension maximum that is greater than both upstream and downstream of the bulged region.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

A flight vehicle has an engine that includes an air inlet, an isolator (or diffuser) downstream of the air inlet, and a combustor downstream of the isolator. The isolator includes a bulged region that has at least one dimension, perpendicular to the direction of the air flow from the inlet to the combustor, that is at a local maximum, larger than comparable isolator dimensions both upstream and downstream of the bulged region. The bulged region stabilizes shocks within the isolator, and facilitates flow mixing. For example, oblique shocks in the vicinity of the bulged region stay anchored for large throttle setting or flight trajectory excursions, which improves flow consistency. The flow diversion of high energy flow around the outermost walls of the bulged section colliding back into the center, where flow is low energy, at the aft end of the isolator, increases mixing of the flows, and results in a more uniform flow entering the combustor. The isolator is still able to provide moderate to high levels of maximum static pressure rise with the incorporation of a bulged portion.

Figure 1:
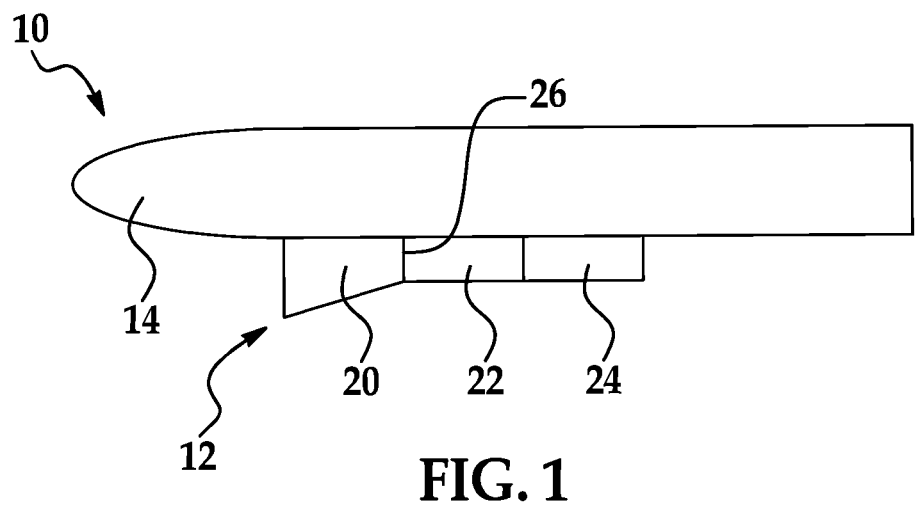
FIG. 1 is a schematic diagram of a flight vehicle according to an embodiment of the present invention.

FIG. 1 schematically shows an air vehicle 10 that is powered by an engine 12 that is mechanically coupled to a fuselage 14. The air vehicle 10 may be a missile, pulse detonation engine, projectile, an unmanned aircraft (an unmanned aerial vehicle or UAV), manned aircraft or an access-to-space vehicle. The air vehicle may have any of a variety of sizes, and any of a variety of operating conditions. In much of the description below the air vehicle 10 is described in terms of a high supersonic to hypersonic air vehicle, with a Mach number ranging from 4 to 6, or more broadly with a Mach number of 2 to 25. However the air vehicle 10 may operate at lower supersonic speeds (Mach number greater than one), or even at subsonic speeds.

The engine 12 may be coupled to the fuselage 14 in any of a variety ways, including parts of the engine 12 being integrally formed with parts of the fuselage 14. The fuselage 14 may have any of a variety of suitable shapes, and may include additional components for carrying out one or more operations of the air vehicle 10. Such additional components, to give a few non-limiting examples, may include control systems (such as for steering), lift-producing and/or control surfaces (such as wings, fins, or canards, either fixed in position or movable in whole or in part), communication systems, cooling systems, sensors or other data-collecting systems, and/or any of a variety of payloads.

Figure 2:
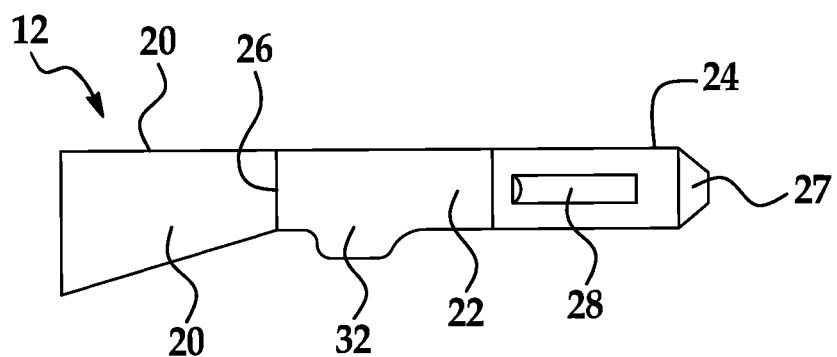
FIG. 2 is a diagram showing components of an engine of the flight vehicle of FIG. 1.

With reference in addition to FIG. 2, the engine 12 includes an air inlet 20, an isolator or diffuser 22, and a combustor or engine combustor 24. The air inlet 20 takes in air from the free air stream and compresses the air, with one or more shocks perhaps occurring as the flow is compressed. The compressed air then exits the air inlet 20 to enter into the isolator 22. There may be a throat 26, a minimum area location at the boundary between the air inlet 20 and the isolator 22. The isolator 22 functions to keep the shocks stable, isolates dynamic flow fluctuations between the inlet and engine, provides demanded pressure rises, and/or provides desired flow patterns at its downstream end, where the air passes from the isolator 22 to the combustor 24. In the combustor 24 fuel is added to the air flow, mixed, combustion occurs, and the combusted flow is passed through a nozzle 27, producing thrust from the engine 12, which is used to power the air vehicle 10. Combustion products are exhausted from a downstream end of the combustor 24 through the nozzle 27. The engine 12 thus defines a flowpath or propulsion flowpath through the inlet 20, the isolator 22, the engine combustor 24, and the nozzle 27.

The combustor 24 may be any of variety of suitable devices for burning a fuel-air or fuel-oxidizer mixture and producing thrust. For example the combustor 24 (and/or the engine 12) may be a ramjet, a scramjet, a dual-mode ramjet/scramjet, or perhaps a turbine jet. In FIG. 2 the combustor 24 is shown as having a turbine 28, but in many embodiments the combustor 24 has no turbine (or other moving parts).

The inlet 20 may have any of a variety of suitable shapes, for example being round, elliptical, or rectangular. The isolator 22 may have a general shape that makes the transition between a square, rectangular, trapezoidal or elliptical shape of the inlet 20 (to give a few examples) to a round or other-shaped combustor 24. The inlet 20 and the combustor 24 may be in line with each other, or may be offset from one another and at different angular orientations.

Figure 3A:
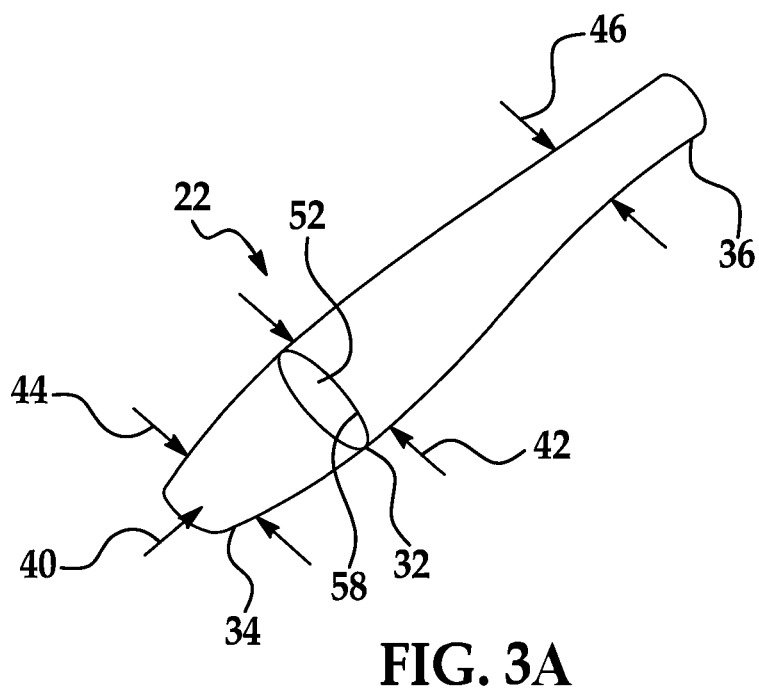
FIG. 3A is an oblique view of an isolator that may be part of the engine of FIG. 2.

FIG. 3A shows further detail of an embodiment of the isolator 22. The isolator 22 has a bulged portion 32 that is between an upstream end 34 and a downstream end 36. The downstream part of the isolator 22, at the downstream end 36, is a mixout region, in which flow distortion due to the bulged region 32 is reduced. The upstream end 34 is the throat of the inlet 26 where the isolator 22 receives flow from the air inlet 20. The downstream end 36 is where the flow exits the isolator 22, to enter the combustor 24. Thus flow through the isolator 22 follows a general airflow direction 40 from the upstream end 34 to the downstream end 36.

Figure 4:
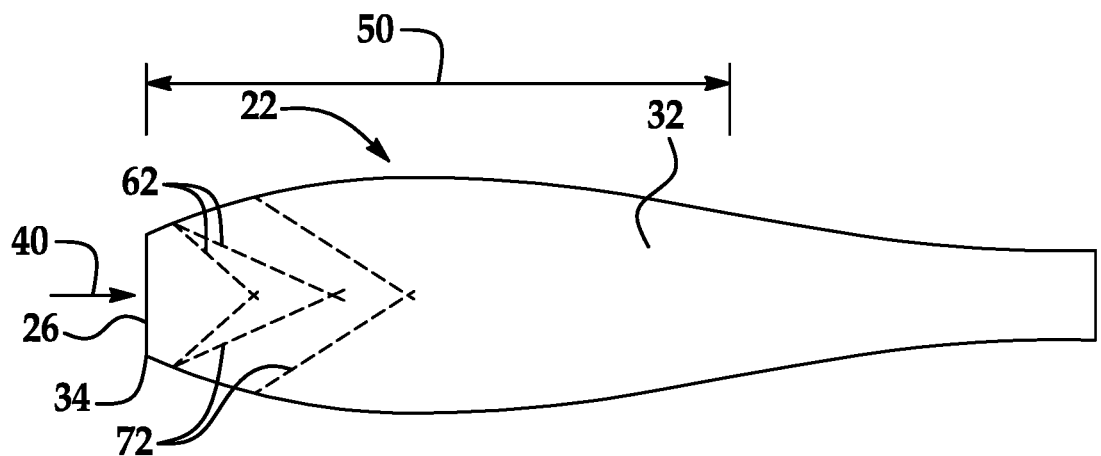
FIG. 4 illustrates operation of the isolator of FIG. 3A in a first operating condition.

The bulged portion 32 has a local maximum in at least one dimension, perpendicular to the airflow direction 40. With reference now in addition to FIG. 4, the bulged portion 32 may have a width 42 (a maximum width), perpendicular to the airflow direction 40, that is greater than both an upstream width 44 and a downstream width 46. The upstream width 44 is upstream of the bulged portion 32, between the bulged portion 32 and the upstream end 34. The downstream width 46 is downstream of the bulged portion 32, between the bulged portion 32 and the downstream end 36.

The bulged portion 32 may also have a local maximum in its height 52, the dimension of the bulged portion 32 that is perpendicular to both the airflow direction 40 and the width 42. The terms "width" and "height" are somewhat arbitrary, and are used herein to indicate different directions that are generally perpendicular to the airflow direction 40, regardless of actual orientation.

The bulged portion 32 may have a local maximum area 58, with the area 58 that is perpendicular to the airflow direction 40 greater than corresponding areas immediately upstream and downstream of the bulged portion 32. The local maximum area 58 may be an area that has a local maximum in all dimensions of the isolator, or may be a local maximum in some dimensions but not in other dimensions. In other words the local maximum area 58 may or may not be at a location of maximum height or width within the isolator 22.

Figure 3B:
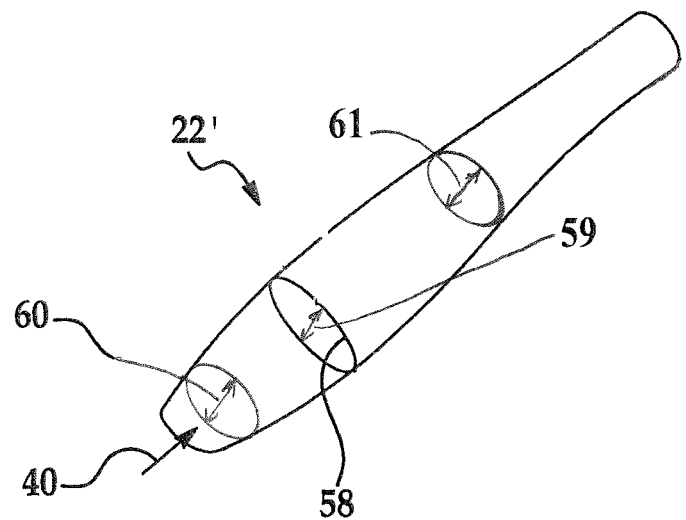
FIG. 3B is an oblique view of alternative isolator.

FIG. 3B shows an example of an alternative isolator 22' that has a local maximum area 58' a local maximum in some dimensions but not in other dimensions. In the isolator 22' the non-local-maximum dimension in a direction perpendicular to airflow through the isolator 22' is less than both the upstream value and the downstream value of that dimension, with a dimension 59 at the maximum area 58' being less than both an upstream dimension 60 and a downstream dimension 61 in the same orientation.

The bulged portion 32 may have a same cross-sectional shape as portions of the isolator 22 immediately upstream and downstream of the bulged portion 32. Alternatively the bulged portion 22 may have a different cross-sectional shape than one or both of the upstream and downstream portions of the isolator 22. For instance, the bulged portion 32 may be elliptical in shape, while the upstream and/or downstream portion may have a different cross-sectional shape, such as circular, or elliptical with a different major/minor axis ratio.

Figure 3C:
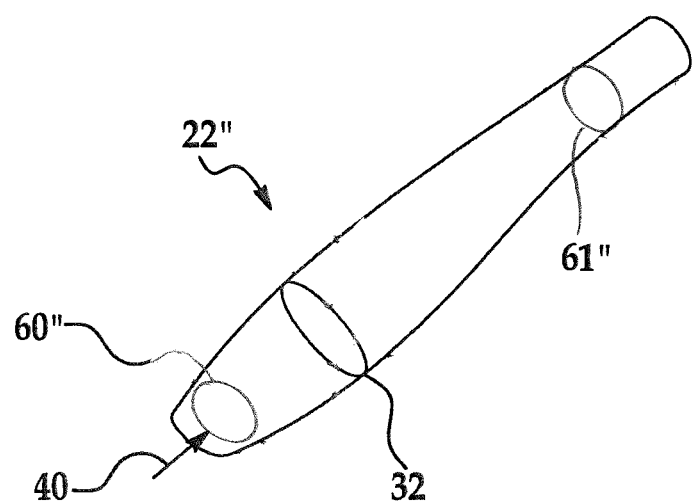
FIG. 3C is an oblique view of alternative isolator.

FIG. 3C shows an example of this last alternative, an isolator 22" with a bulged portion 32' that is elliptical in cross-sectional shape, with an upstream shape 60" and a downstream shape 61" that have circular cross-sectional shapes.

The change in one or more dimensions in the bulged portion 32 may be done continuously in a longitudinal direction, along the general direction 40 that air flows through the isolator 22. That is, there may be no stepwise discontinuities in the isolator surface, or even discontinuities in the slope of the isolator surface, but instead a smoothly changing surface of the isolator 22 in the bulged portion 32, and/or in making the transition from the bulged portions 32 to upstream and downstream portions of the isolator 22. Alternatively such stepwise discontinuities may be present. The bulged portion 32 may be flat walled, or may have an intentional kink in the wall at a location or locations to anchor oblique shock waves.

Figure 5:
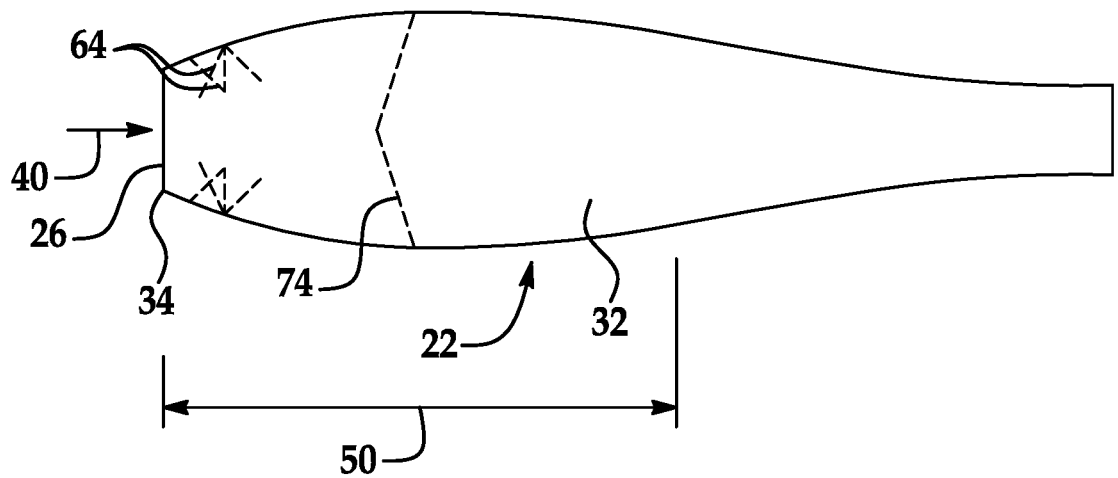
FIG. 5 illustrates operation of the isolator of FIG. 3A in a second operating condition.

FIGS. 4 and 5 show an embodiment of the isolator 22 in operation, for two different isolator airflow profiles, provided by two different inlet designs operating at different Mach numbers. The bulged portion 32 is closer to the upstream end 24 of the isolator 22, near the throat or inlet 34 where flow enters the isolator 22. More broadly, the bulged portion 32 may be in the upstream half 50 of the isolator 22. The geometry of the bulged portion 32, in particular the outwardly-angled upstream part of the bulged portion 32, sets up a series of shocks in the flow when demanded by the combustor 24.

There is a tendency such that when throttle is increased, the combustor 24 demands a higher pressure rise (to satisfy conservation of mass). The propulsion system satisfies this by decreasing the pressure losses in the isolator 22 through shock train changes which in turn raise the pressure for the combustor 24. At some point the isolator 22 shock train may no longer be able to increase pressure, so to conserve mass the mass flow must be reduced and the shock system is ejected out the isolator 22 and inlet 20 to allow mass flow to be spilled. Also, the same effect can be realized for a constant throttle setting if flight condition (Mach number, altitude, angle-of-attack, and/or yaw) is varied.

The shocks shown are a series of oblique shocks, shown at reference number 62 in FIG. 4 and reference number 64 in FIG. 5. Reference numbers 62 and 64 show the location of the strongest shocks for high or medium back pressure, and one or more of the shocks shown may be present for any given flow condition. The expanding geometry in this forward (upstream) part of the bulged portion 32, where the oblique shocks 62 and 64 are located, helps keeps the shocks 62 and 64 in place, and from moving further upstream in the isolator 22. The increasing area of the isolator (up to the location 42 of a local maximum, such as a maximum width) keeps the shock system located in this portion. The contracting geometry in the downstream part of the bulged portion 32 also helps to keep the angled shocks 62 and 64 from moving further downstream out of the bulged portion 32, allowing this portion of the isolator to be used for flow mixing. At low back pressure or very high Mach numbers, the strongest shocks may move further downstream, for example the shocks 72 (FIG. 4) and 74 (FIG. 5).

The geometry of the bulged portion 32 aids in setting up shock structures that stay anchored in the forward section of the isolator for a wide range of throttle settings or flight conditions (flow speeds and combustor pressures). This may keep the isolator exit profile of the flow largely unchanged (and/or more uniform) over a range of operating conditions, since the shocks 62 and 64 remain at the same locations or at similar locations over the variety of operating conditions (contrary to traditional isolator design operation).

The change of area ratio within the bulged portion 32 (from small to large to small) may serve to keep the shock train (the shocks 62 and 64) in the upstream half 50 of the isolator 22 for a broad range of flight conditions and throttle settings. More broadly the shock train may be retained in an upstream portion of the isolator 22, such as upstream of the bulged portion 32. The range of conditions may encompass the full range of practical operating conditions for the flight vehicle 10 (FIG. 1). Locating the bulged portion 32 in the upstream half 50 of the isolator 22 allows the downstream half of the isolator 22 to be used for flow mixing of the outboard flow stream and centerline flow stream, without any, or minimal, shocks present in the downstream half. This allows for more uniform flow at the exit of the isolator 22, where the flow transfers into the combustor 24 (FIG. 1). Distortion, such as low total pressure distortion, momentum distortion, mass flux distortion, and/or Mach distortion, can be reduced or minimized with this flow mixing.

A maximum cross-sectional area of the bulged region, perpendicular to the airflow through the isolator, may be at least 110% of either a minimum cross-sectional area of the isolator or relative to the area at the aft end of the isolator, perpendicular to the airflow through the isolator. This value may be larger, such as at least 120%, at least 130%, at least 140%, at least 150%, at least 160%, at least 170%, at least 180%, at least 190%, at least 200%, or in any range of using the values of this sentence and the preceding sentence.

For some types of flow (e.g., for some Mach numbers) it may be advantageous to configure a bulged region with an expansion in width coupled with shrinkage in height. The width ratio in the bulged region may be 1.04 to 1.4, but this range is only an example, and other ratios are possible, for example varying based on Mach number and the incoming shock system.

The angling of the side walls in the bulged region (from the upstream throat to the bulged region) may vary for different embodiments. It may be about 2°, about 3°, about 4°, about 5°, about 6°, about 7°, about 8°, about 9°, about 10°, about 11°, about 12°, about 13°, about 14°, about 15°, about 16°, about 17°, about 18°, about 19°, about 20°, or in any range using any two of these values. These values are only examples, and other angles are possible.

The maximum area of the isolator may occur in the upstream half (by length) of the isolator. Alternatively it may be in the middle of the isolator, or in the downstream half of the isolator.

Such isolators may result in improved flow mixing and/or flow uniformity (reducing flow distortion), for example by as much as 400% to 1,000% or more. Flow distortion can be defined a multitude of ways with various flow parameters and distortion determinations. SAE ARP1420B circumferential distortion intensity definitions are one common way of evaluating and measuring distortion. Distortion intensity differences per ring, per SAE ARP1420B A.1.2, may be improved by as much as 200% to 400% or more. However depending on the situation other definitions and measurements may be applicable. For example mass flux distortion may be a more important parameter for a ramjet or scramjet than total pressure distortion (which is important for turbojet applications). Also, radial distortion or overall distortion (with no regard to radial or circumferential) may be more important than circumferential distortion. Usage of these different parameters may give even greater improvements in distortion reduction. The effect of reduced distortion may improve combustion efficiency by 10% or more.

Many alternate shapes for the bulged region 32 are possible. The features of the embodiments and variations described above may be combined in a single embodiment if possible.

The isolator 22 may offer a variety of other advantages. These may include the potential ability of the bulged configuration to create additional losses at very low back pressures (relative to those of a traditional isolator), which will allow the vehicle to operate in the more efficient "ramjet" mode of operation (primarily subsonic combustion) for a larger range of flight conditions than a traditional design. Another possible advantage is reducing potential for combustion gas re-circulation in the isolator which could cause melting of the isolator material, resulting in burn-through. Further, there may be lower flow distortion at yaw conditions, in comparison with traditional isolator configurations. The consistent isolator exit flow pattern across many flight conditions and throttle settings, which may be a reduced flow distortion pattern, also may reduce fuel consumption, improve vehicle efficiency, increase thrust/acceleration capabilities, allow for a better system solution during conceptual design. Also there may be a reduction of non-uniform combustor heating which can lead to fuel injection flow issues (if fuel is being run around the combustor to cool it).

Figure 6:
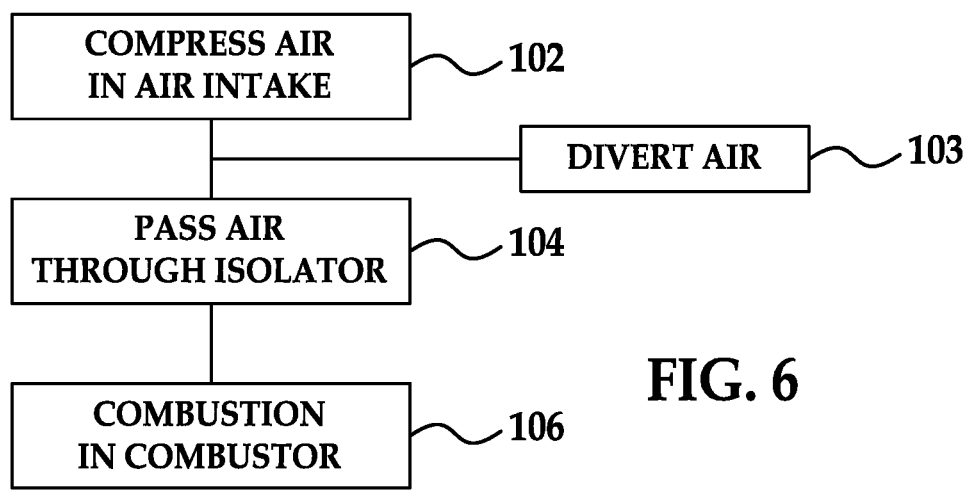
FIG. 6 is a high-level flow charting illustrating a method according to an embodiment of the invention.

FIG. 6 is a high-level flow chart illustrating a method 100 of operating an engine, such as the engine 12 (FIG. 2). In step 102 air coming into the engine is compressed in an air intake. Some of the air may be dumped overboard at an inlet diverter or inlet bleed holes, such as shown in step 103. In step 104 compressed air from the downstream end of the air intake passes through the isolator, on its way to the combustor. In passing through the isolator the flow passes through the oblique shocks (if any such shocks are required), fixed in the bulged portion of the isolator. Finally, in step 106 the air that has passed through isolator is used for combustion of fuel in the combustor.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight vehicle comprising:
a fuselage; and
an engine mechanically coupled to the fuselage;
wherein the engine includes:
  an air inlet;
  an isolator defining an interior passage and located downstream of the air inlet, and upstream of where any fuel is added; and
  a combustor downstream of the isolator;
wherein air passing through the air inlet and the interior passage of the isolator to the combustor passes through a minimum cross-sectional area at a throat that is at the boundary between the air inlet and the interior passage of the isolator;
wherein the interior passage of the isolator has a bulged region without discontinues in slope of an isolator surface, where at least one dimension of the interior passage of the isolator, in a direction perpendicular to airflow through the interior passage of the isolator, has a local dimension maximum that is greater than both upstream and downstream of the bulged region, with all the airflow entering an upstream end of the interior passage of the isolator from the air inlet exiting a downstream end of the interior passage of the isolator, to enter the combustor; and
wherein the bulged region has a cross-sectional area, perpendicular to the airflow through the interior passage of the isolator, that has a local area maximum that is greater than both upstream and downstream of the bulged region.

2. The flight vehicle of claim 1, wherein a shape of the cross-sectional area is the same as cross-sectional shapes, perpendicular to the airflow through the interior passage of the isolator, both upstream and downstream of the bulged region.

3. The flight vehicle of claim 1, wherein a shape of the cross-sectional area is different from at least one of cross-sectional shapes, perpendicular to the airflow through the interior passage of the isolator, both upstream and downstream of the bulged region.

4. The flight vehicle of claim 1, wherein the bulged region has at least one additional dimension that does not have a local maximum in another direction perpendicular to the airflow through the interior passage of the isolator, the at least one additional dimension being less than at least one of an upstream value and a downstream value.

5. The flight vehicle of claim 4, wherein the at least one additional dimension in the another direction perpendicular to the airflow through the isolator is less than both the upstream value and the downstream value.

6. The flight vehicle of claim 1, wherein the combustor is a ramjet or a scramjet.

7. The flight vehicle of claim 1, wherein the combustor includes a turbine.

8. The flight vehicle of claim 1, wherein the engine is a supersonic engine or a hypersonic engine.

9. The flight vehicle of claim 1, wherein the bulged region has a circular cross-section in the direction perpendicular to the airflow through the interior passage of the isolator.

10. The flight vehicle of claim 1, wherein the bulged region has an elliptical cross-section in the direction perpendicular to the airflow through the interior passage of the isolator.

11. The flight vehicle of claim 1, wherein the bulged region functions as a shock trap that limits movement of shocks within the isolator.

12. The flight vehicle of claim 1, wherein the interior passage of the isolator includes a mixout region in an aft portion of the bulged region, in which flow distortion due to the bulged region is reduced.

13. A flight vehicle comprising:
a fuselage; and
an engine mechanically coupled to the fuselage;
wherein the engine includes:
  an air inlet;
  an isolator defining an interior passage and located downstream of the air inlet, and upstream of where any fuel is added; and
  a combustor downstream of the isolator;
wherein air passing through the air inlet and the interior passage of the isolator to the combustor passes through a minimum cross-sectional area at a throat that is at the boundary between the air inlet and the interior passage of the isolator;
wherein the interior passage of the isolator has a bulged region without discontinues in slope of an isolator surface, where at least one dimension of the interior passage of the isolator, in a direction perpendicular to airflow through the interior passage of the isolator, has a local dimension maximum that is greater than both upstream and downstream of the bulged region, with all the airflow entering an upstream end of the interior passage of the isolator from the air inlet exiting a downstream end of the interior passage of the isolator, to enter the combustor; and
wherein a maximum cross-sectional area of the bulged region, perpendicular to the airflow through the isolator, is at least 110% of a minimum cross-sectional area of the interior passage of the isolator, perpendicular to the airflow through the isolator.

14. A method of operating a flight vehicle engine, the method comprising:
compressing air coming into the engine, in an air intake of the engine;
passing the air from the air intake through an interior passage of an isolator of the engine that is upstream of where any fuel is added, to a combustor of the engine, with all airflow that enters the interior passage of the isolator from the intake exiting the interior passage of the isolator to the combustor; and
using the air from the interior passage of the isolator for combustion of the fuel in the combustor;
wherein the passing the air through the isolator includes passing the air through a bulged region of the interior passage of the isolator without discontinues in slope of an isolator surface, with the bulged region having a local maximum in cross-sectional area perpendicular to a direction of air flow through the interior passage of the isolator, with the cross-sectional area greater in the bulged region than both upstream of the bulged region and downstream of the bulged region.

15. The method of claim 14, wherein the passing the air through the isolator includes causing shocks in the air flow in the bulged region.

16. The method of claim 15, wherein the causing the shocks include causing angled shocks that are not perpendicular to the direction of the air flow through the isolator.

* * * * *